(12) United States Patent
Brandtner

(10) Patent No.: US 8,438,716 B2
(45) Date of Patent: May 14, 2013

(54) INTEGRATED BASE ASSEMBLY

(75) Inventor: Timothy A. Brandtner, Ettrick, WI (US)

(73) Assignee: Ashley Furniture Industries, Inc., Arcadia, WI (US)

( * ) Notice: Subject to any disclaimer, the term of this patent is extended or adjusted under 35 U.S.C. 154(b) by 0 days.

(21) Appl. No.: 13/195,472

(22) Filed: Aug. 1, 2011

(65) Prior Publication Data

US 2012/0017420 A1 Jan. 26, 2012

Related U.S. Application Data

(62) Division of application No. 12/138,323, filed on Jun. 12, 2008, now Pat. No. 7,988,236.

(60) Provisional application No. 60/934,851, filed on Jun. 15, 2007.

(51) Int. Cl.
*B23P 25/00* (2006.01)

(52) U.S. Cl.
USPC .................................................. 29/525.01

(58) Field of Classification Search ............... 29/525.01, 29/428, 527.1, 458; 297/440.1, 440, 440.14; 248/188.1, 168
See application file for complete search history.

(56) References Cited

U.S. PATENT DOCUMENTS

| | | |
|---|---|---|
| 2,754,893 A | 7/1956 | De Rouin |
| 3,439,812 A | 4/1969 | Nagelkirk et al. |
| 3,658,382 A | 4/1972 | Anderson |
| 3,680,898 A | 8/1972 | Herrmann |
| 3,874,804 A | 4/1975 | Siegal |
| 3,949,534 A | 4/1976 | Croy et al. |
| 3,957,239 A | 5/1976 | Slaats et al. |
| 3,986,316 A | 10/1976 | Blodee |
| 4,067,073 A | 1/1978 | Komarov |
| 4,076,432 A | 2/1978 | Glaser |
| 4,133,507 A | 1/1979 | Chervenak |
| 4,261,148 A | 4/1981 | Scott |
| 4,261,667 A | 4/1981 | Ervin et al. |
| 4,277,198 A | 7/1981 | Beckman |
| 4,376,555 A | 3/1983 | Grass |
| 4,436,342 A | 3/1984 | Nilson et al. |
| 4,480,061 A * | 10/1984 | Coughlin et al. ............... 524/13 |
| 4,607,972 A | 8/1986 | Hennick |
| 4,671,693 A | 6/1987 | Rossman |
| 4,691,965 A | 9/1987 | Hsuing |
| 6,776,380 B1 * | 8/2004 | Kirk et al. ..................... 248/188 |
| 2007/0063112 A1 | 3/2007 | Patterson |

FOREIGN PATENT DOCUMENTS

| | | |
|---|---|---|
| EP | 1 369 057 B1 | 1/2007 |
| GB | 218764 | 7/1924 |

(Continued)

OTHER PUBLICATIONS

Application and File History of U.S. Appl. No. 12/138,323, Inventor Timothy A. Brandtner, filed Jun. 12, 2008, now U.S. Patent No. 7,988,236, issued Aug. 2, 2011.

*Primary Examiner* — John C Hong

(74) *Attorney, Agent, or Firm* — Christensen Fonder P.A.

(57) ABSTRACT

A method of manufacturing furniture, such as sofas, that have a lower exposed front rail with corner block portions. The method including injection molding the front rail with the corner block and assembling it to side rails and a rear rail whereby there are no exposed junctures at the corner blocks on the front rail.

15 Claims, 12 Drawing Sheets

FOREIGN PATENT DOCUMENTS

| | | |
|---|---|---|
| GB | 594543 | 11/1947 |
| GB | 2 026 645 A | 2/1980 |
| GB | 2 118 303 A | 10/1983 |
| GB | 2 147 969 A | 5/1985 |
| GB | 2 213 551 A | 8/1989 |
| WO | WO 00/03849 | 1/2000 |

\* cited by examiner

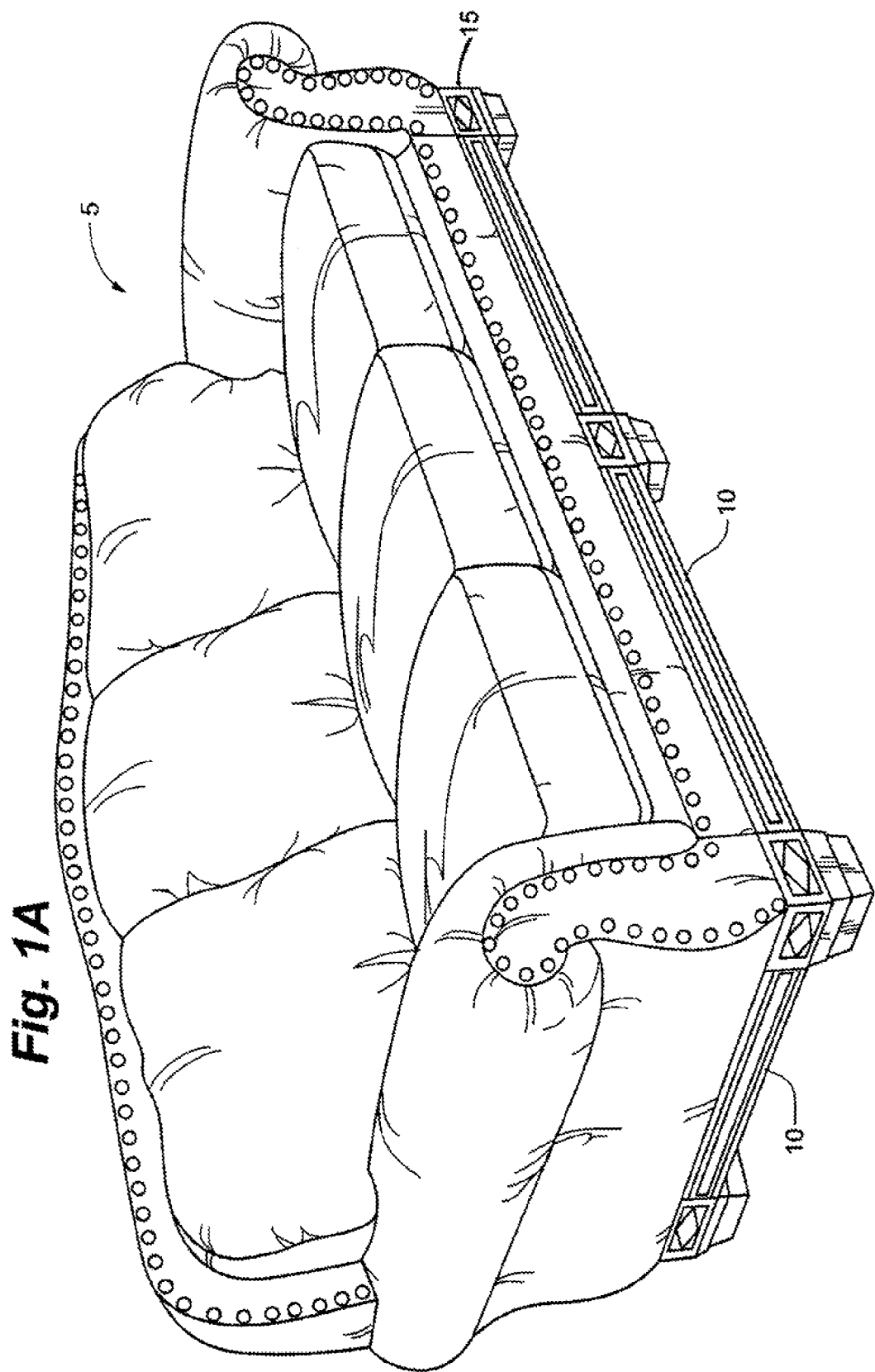

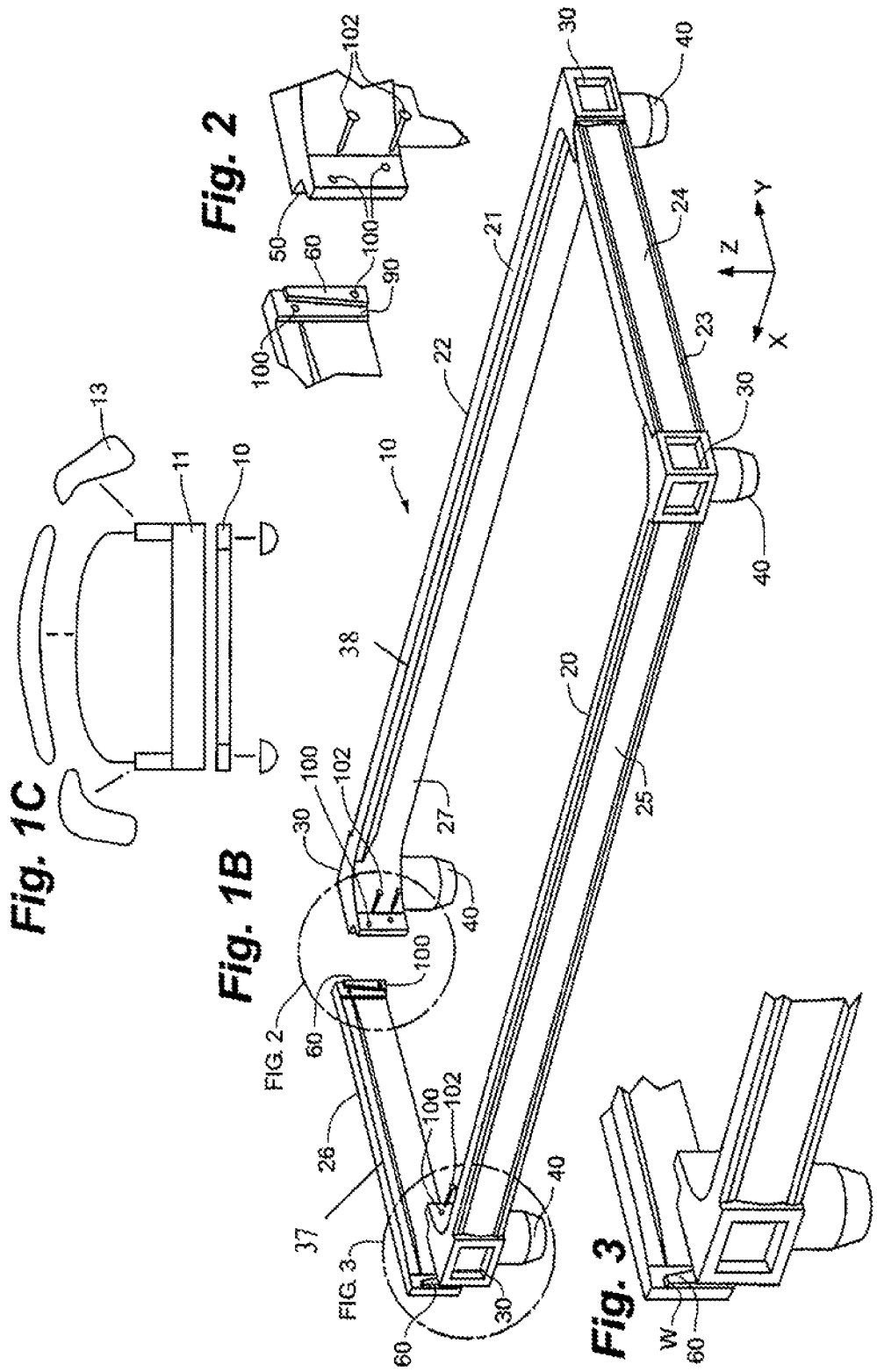

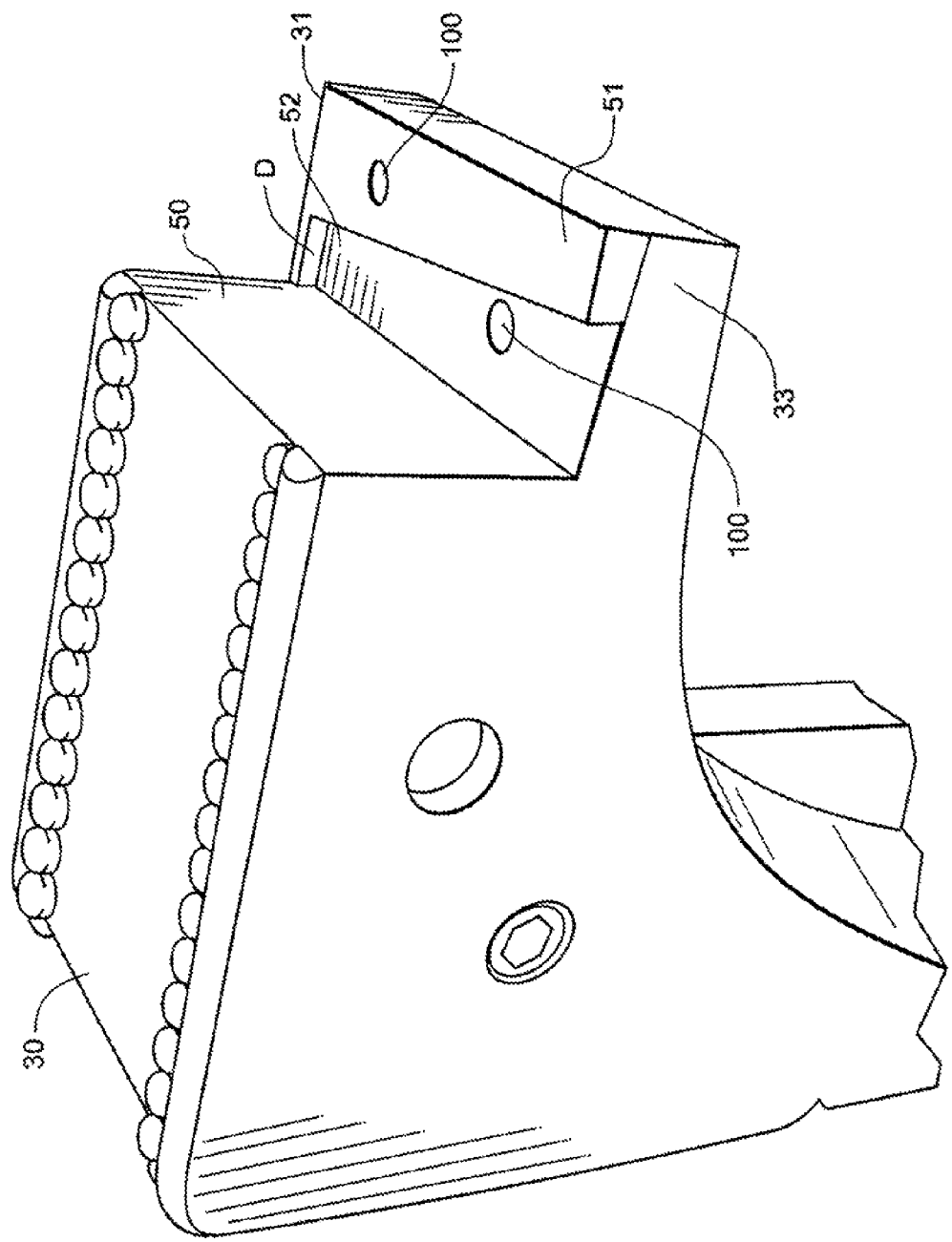

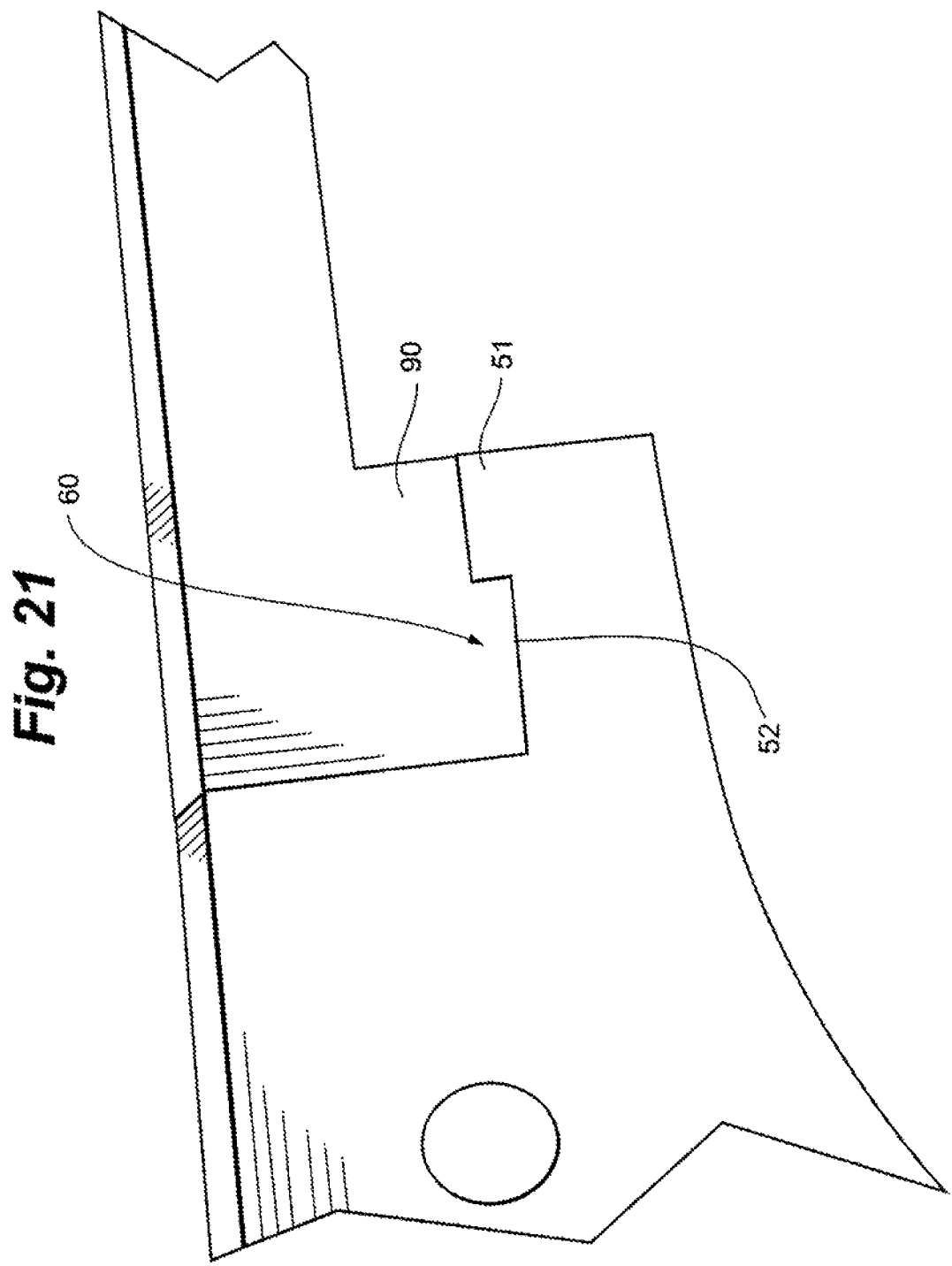

INTEGRATED BASE ASSEMBLY

PRIORITY CLAIM

The present application is a divisional of U.S. patent application Ser. No. 12/138,323, filed Jun. 12, 2008 (U.S. Pat. No. 7,988,236, issuing Aug. 2, 2011), which application claims priority to U.S. Provisional Application Ser. No. 60/934,851 filed Jun. 15, 2007, and entitled "INTEGRATED BASE ASSEMBLY", which applications are hereby incorporated by reference in their entirety.

FIELD OF THE DISCLOSURE

The disclosure relates to furniture construction, and in particular, to the manufacture and assembly of furniture that utilizes an integrated base assembly. More specifically, the disclosure relates to a base assembly for furniture, such as a sofa or chair, wherein the base is readily assembled, and wherein the construction reduces gap formation at the joints of the assembly.

BACKGROUND OF THE INVENTION

Where the location of manufacture is close to the place of sale, it is common practice to ship pieces of furniture in their fully assembled state, such that the piece of furniture is ready to be displayed or used by the purchaser. Shipping fully assembled furniture requires a large volume of space and difficulties in packaging. The large volume of space and, consequently, high numbers of shipping containers translate to expensive shipping costs, especially over long distances. Therefore, it is advantageous to be able to ship furniture in an unassembled state for assembly at another location, preferably nearer the furniture product's final destination. For example, due to lower labor and material costs, increasingly, furniture may be manufactured overseas and shipped via containers from abroad. Unassembled furniture is more compact and can be shipped more efficiently and cost-effectively in an unassembled state. Shipping furniture in the unassembled state provides cost reduction, for example, shipping more components in a given amount of space with the ability to ultimately ship more total complete pieces of furniture. However, once the unassembled furniture reaches its final destination, it must be reassembled for sale to the consumer. Hence, it is beneficial if the cost of assembling the furniture product is cost-effective when compared to the costs of shipping assembled furniture or furniture sub-assemblies.

Articles of furniture, for example, sofas and chairs often include an exposed base assembly commonly called a showood base. The base assembly typically comprises four rail members, four corner members, four leg members, as well as the attendant hardware to secure the various base pieces to one another to form the base assembly. Generally, non-hardware components are manufactured from wood. An assembled base, when shipped, occupies a greater volume and requires greater space and packaging than the base components in an unassembled state. Therefore, it is advantageous from an overall shipping cost perspective, to ship the base components in an unassembled state. However, the cost of assembling the furniture base at its final destination, where labor cost may be high, should be weighed against the benefits of reduced shipping costs. Therefore, it would be generally advantageous if the furniture base can be easily and efficiently assembled at its final destination.

Because the various exposed components of showood bases are formed of wood, often the wood finish results in unacceptably differing appearances from component to component. This difference in finish necessitates gathering matching sets of components before assembly of the showood base. The mismatching of finished pieces is particularly a problem with the front rail and corner blocks because the front aspect of the showood base is generally the aspect on view. The problem of difference in finish of components of the showood base can also exist with injection-molded pieces, as the color of the pieces can vary from lot to lot. It would be desirable to eliminate or minimize the mismatching of base assembly pieces.

Furniture product components, for example, sofa showood bases and chair showood bases, include joints where rail members of the base meet and are joined with the corner block members of the base. Typically, the rail members are arranged at an angle of approximately 90° at the corner block member and are interconnected. Each furniture leg member is also generally connected to a corner block member. Conventional furniture corner joints have been known to be made by utilizing a dovetail connection, by dowel or mortise and tenon connection, or by screwing or bolting the adjacent components together. Dovetail joints generally require highly skilled-craftsman and typically the joints are glued, resulting in high labor costs and time of manufacture. Dowel connections, or joints that are screwed together may produce comparatively unstable furniture joints and joint gaps. Mortise and tenon joints are also known, however, skilled workers are generally needed to assemble the furniture without creating joint gaps, and often jigs or fixtures are needed to hold the component pieces during the assembly process.

A known type of joint for a furniture base corner joint includes a pair of rails members, a leg member and a corner block member to which the two rail members and the leg member are affixed. The two rail members can be fastened to the corner block member via fasteners, such as screws, nails, or bolts, and the leg member is fastened to the underside of the corner block member via fasteners such as screws, nails, or bolts. Further, to strengthen the corner joint, a bracket straddling the corner joint may be affixed on the interior of the joint. The bracket can be affixed to the corner block member and the two neighboring rail members connected to the corner block member, via fasteners such as screws or bolts. This construction involves a number of components, is time consuming, and may, nevertheless, lead to gaps at the intersection of the rail members and the corner block member. Examples of this type of construction are shown in FIGS. 19 and 20.

Despite the various methods available for furniture construction and, in particular, sofa and chair base construction, there remains a demand for an efficient and cost effective system of constructing a base assembly with a minimal number of component parts and minimal potential for gap formation at the intersection of the rail member and corner block member components.

SUMMARY OF THE INVENTION

The need of the industry for upholstered furniture with an exposed furniture base having exposed corner blocks that is easily assembled, preferably without the use of a jig or fixture, provides for a reduced number of component parts, and provides for aesthetically pleasing and structurally sound base assembly joints. In a preferred embodiment, the front rail and the rear rail of the base assembly have no exposed joints on the front side or rear side. In one aspect of the invention, the front rail member and the rear rail member are each integrally formed with exposed corner block members, thus forming an integral unitary rail member extending all of the way from the left side to the right side. Side rail members are joined to the integral front and rear rail members at the sides of the base assembly. Specifically the side rails attach at the back side of the front rail and front side of the rear rail. The joints between the front and rear rail members comprise integral wedge engagement portions and a stop. In a preferred embodiment, each end of the side rails and front and back rails include tongue and groove configurations for facilitating a tight joint.

An advantage and feature of certain embodiments of the invention, for example as described above, is that minimal components parts are needed to assemble the base assembly and the rear rail and front rail may be identical to one another thus allowing them both to be formed by a single apparatus such as in a plastic mold. Similarly the two side rails may be identical to one another allowing both pieces to be formed from a single mold. A further advantage is that the rails may be injection molded thereby integrally forming during the molding process on each end of the rails the tongue and groove features. This can eliminate or minimize any milling or machining operations to form the finished piece.

In another embodiment, the rear rail member and the side rail members do not include the corner block members. The side rails may be affixed to the rear rail using the same connection configurations as the front rail-side rail connections or alternative connections.

In yet another embodiment, the front rail member and the rear rail member are joined to two short rail members, wherein the two short rail members are side rail members, thereby forming an integrated base assembly, including a means for positioning the seams formed by joining the two side rail members to the front rail member and the rear rail member along a side aspect of the integrated base assembly. The joint seams are positioned in a side aspect of the base assembly by way of affixing the side rail members to the front rail member and the rear rail member through corner block portions that are integrally formed in the free ends of the front rail member and the rear rail member.

In another embodiment, the front rail member comprises two integrally formed corner blocks, and the side rail members each comprise one integrally formed corner block portion. The assembly assembles with the side rail corner blocks positioned rearwardly and the rear rail joined to and extending between said corner blocks. The joints comprise wedge pieces and may have cooperating tongue-in-groove configurations and stop portions.

In yet another embodiment, a method for assembling furniture having showood bases comprises manufacturing for each furniture piece's showood base, components comprising a front rail with integral corner block portions, a rear rail with integral corner block portions, a pair of side rails with adjacent opposing rabbets for connection to the front rails at the corner block portions, finishing the components, shipping the components unassembled for a multiplicity of pieces of furniture from a first geographic location to a second geographic location, assembling the showood base components at the second geographic location, and assembling the assembled showood base with the remaining components of the piece of furniture.

A feature and advantage of the invention compared to conventional assembly methods and sofas is that the number of components needed to assemble the base is greatly reduced, the difficulty of assembly is greatly reduced, the time of assembly is greatly reduced, and the expense is correspondingly greatly reduced. Moreover the structural integrity is generally greater.

It is noted that a showood base need not be fully exteriorally exposed, and a portion of the showood base may be covered with upholstery. A showood base is generally positioned intermediate the furniture piece's legs or feet and the frame of the furniture piece.

BRIEF DESCRIPTION OF THE DRAWINGS

These as well as other objects and advantages of this invention, will be more completely understood and appreciated by referring to the following more detailed description of the presently preferred exemplary embodiments of the invention in conjunction with the accompanying drawings of which:

FIG. 1A is a view of an upholstered furniture piece with a showood base.

FIG. 1B is a perspective view of a partially assembled integrated base assembly;

FIG. 1C is an exploded elevational view of a sofa according to the invention;

FIG. 2 is close-up perspective view of an integrated base assembly joint, prior to being affixed;

FIG. 3 is a close-up perspective view of an integrated base assembly joint, prior to being affixed;

FIG. 4 is a perspective view of a rabbet and stopped groove of the integrated rail member;

FIG. 21 is a top perspective view of the joint between a side rail member and an integrated rail member.

Figure 5:
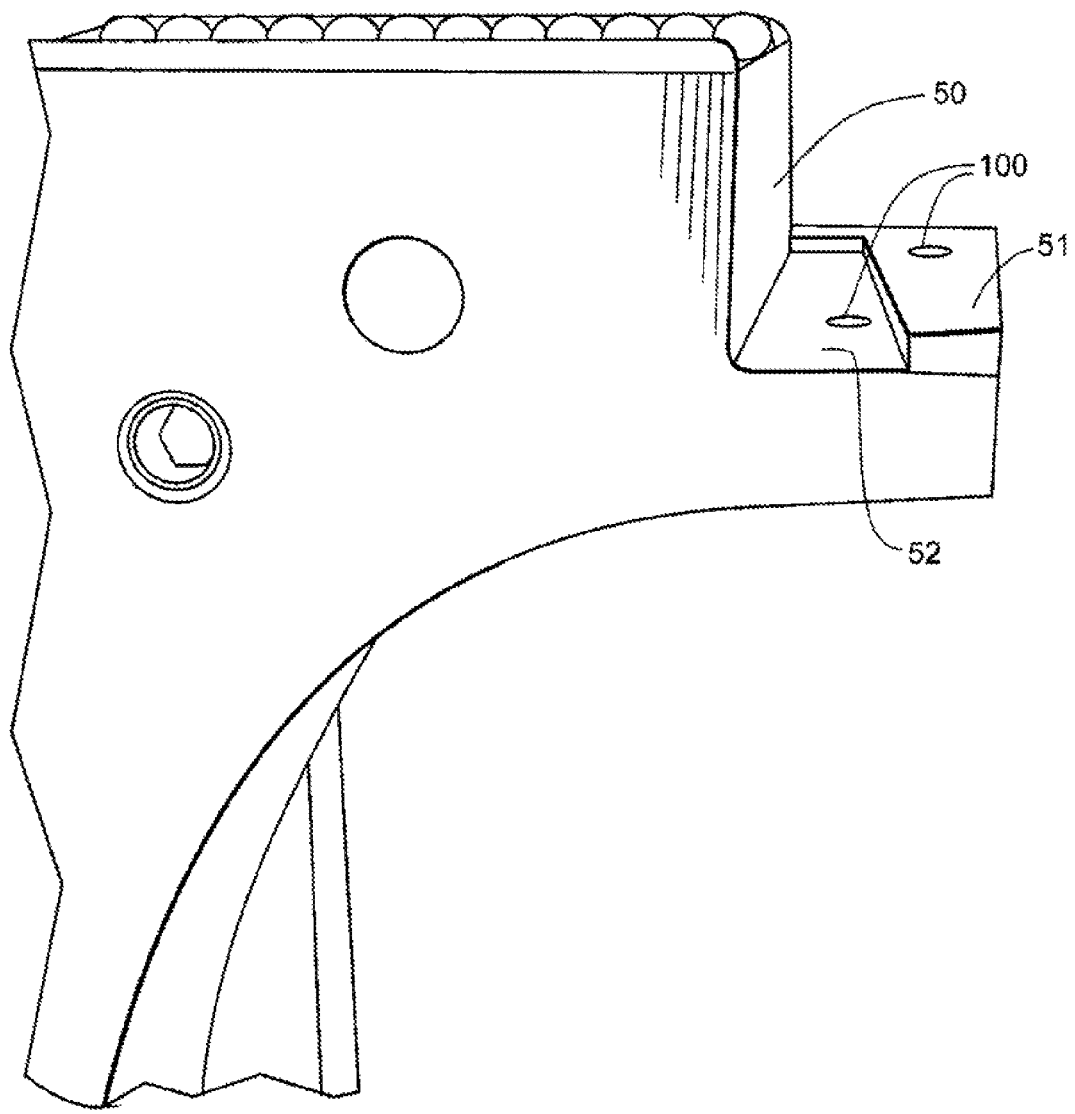
FIG. 5 is a side view of a rabbet and stopped groove of the integrated rail member.
Figure 6:
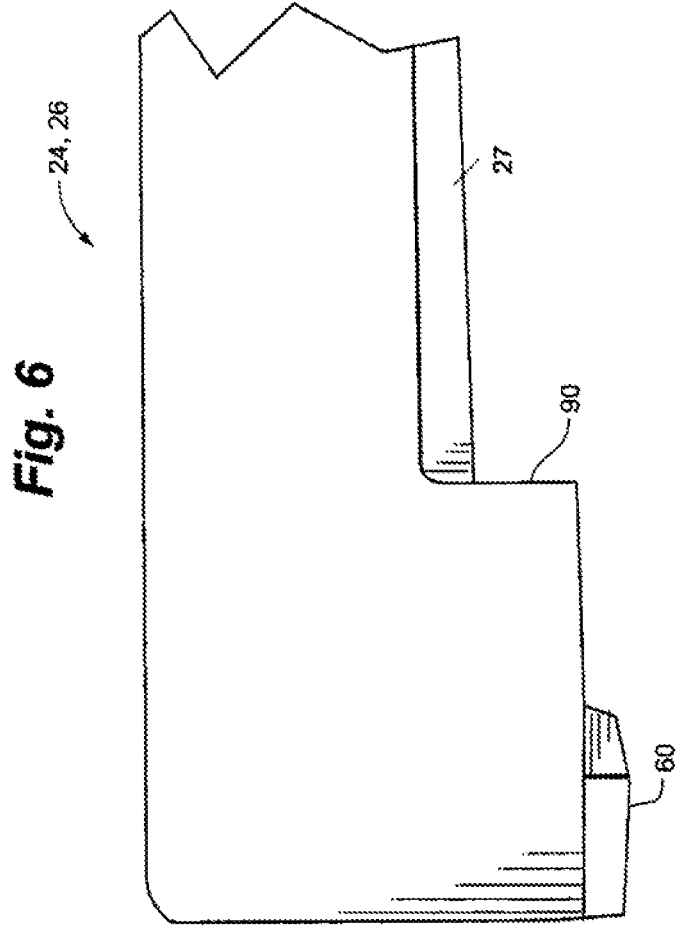
FIG. 6 is a side view of a side rail member showing a raised lip and protrusion.
Figure 7:
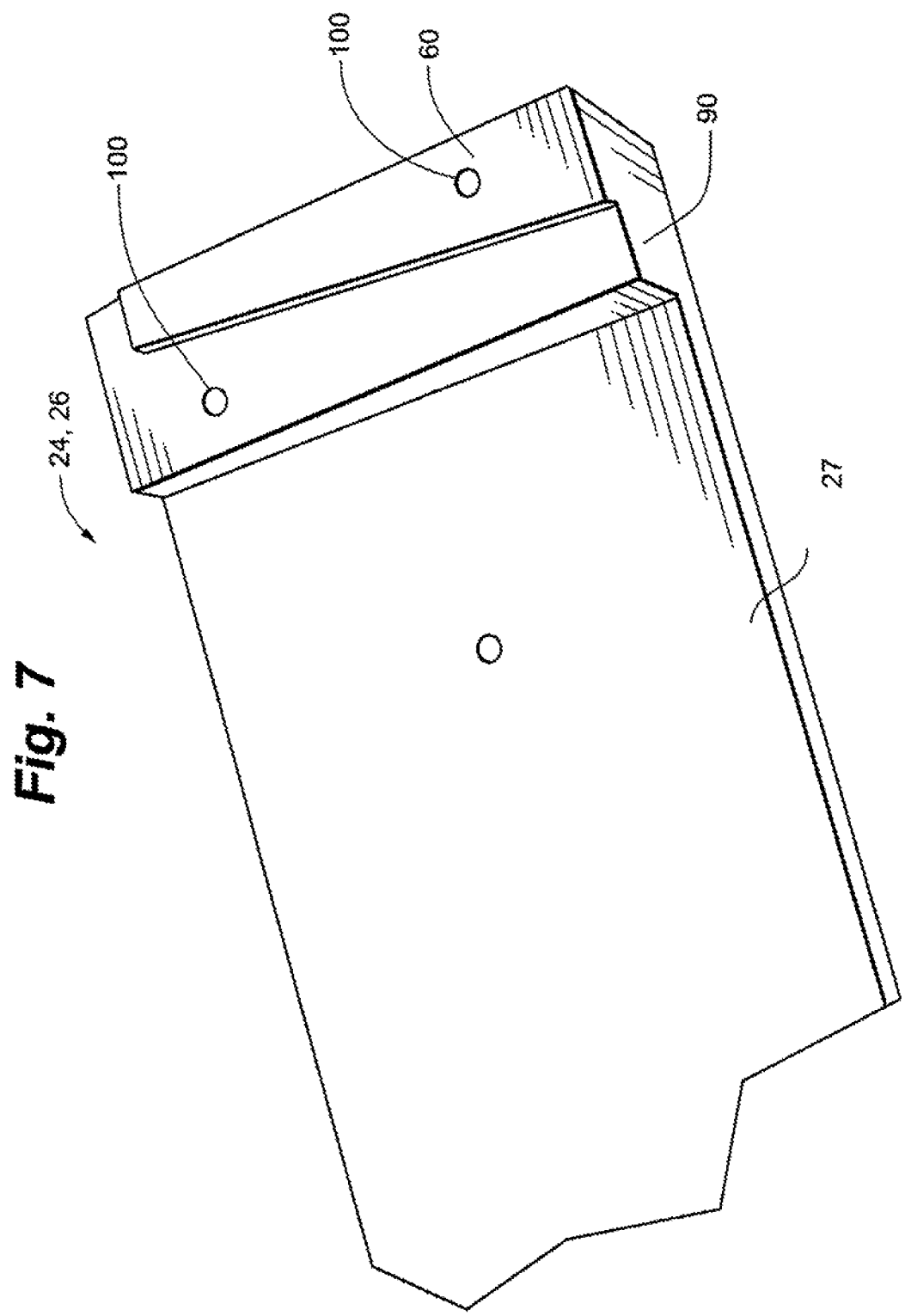
FIG. 7 is a top perspective view of a side rail member showing a raised lip and protrusion.
Figure 8:
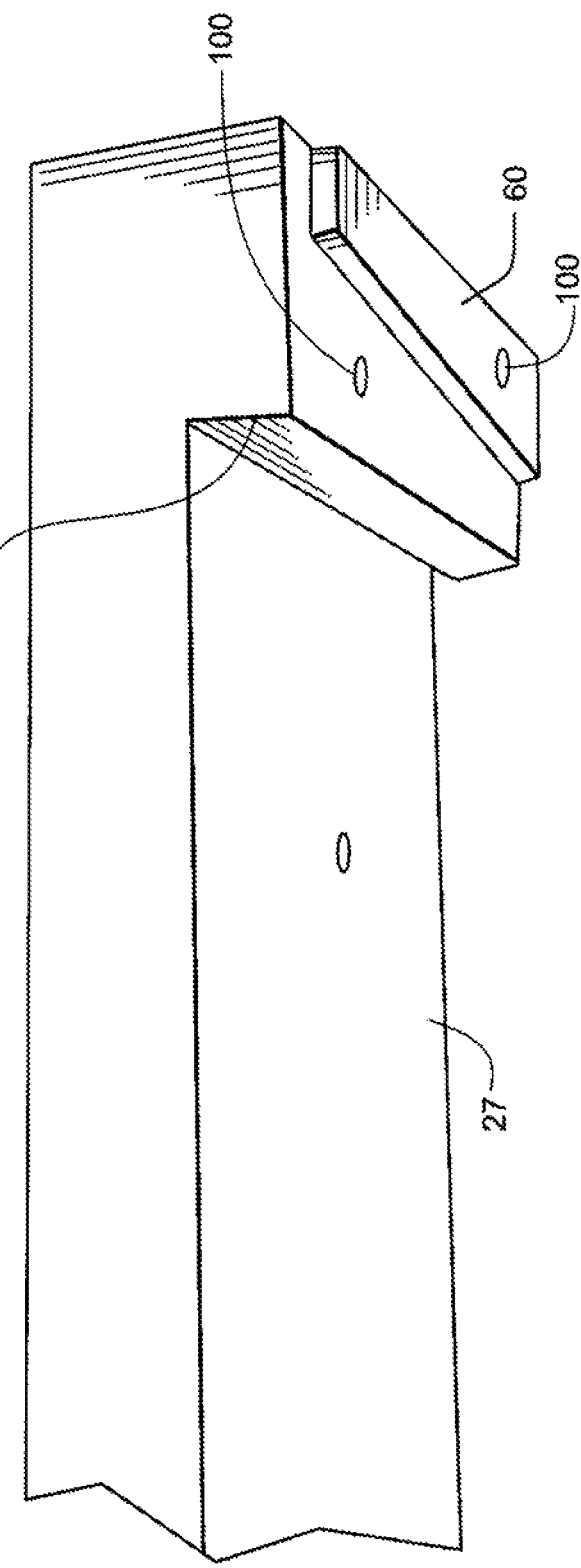
FIG. 8 is a side perspective view of a side rail member showing a raised lip and protrusion.
Figure 9:
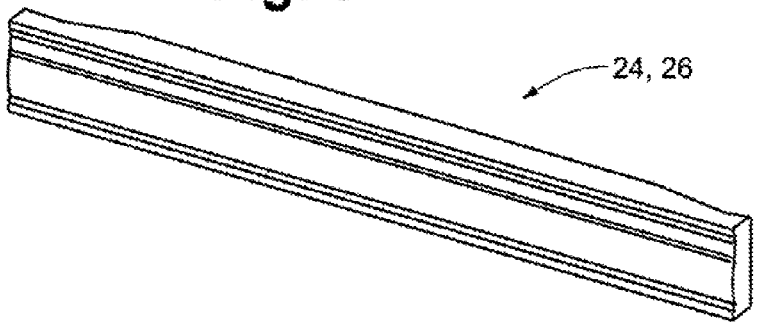
FIG. 9 is a perspective view of a side rail member.
Figure 10:
FIG. 10 is a top planar view of a side rail member.
Figure 11:
FIG. 11 is a bottom planar view of a side rail member.
Figure 11A:
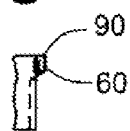
FIG. 11A is a side view of the end edge of a side rail member, showing a raised lip and protrusion.
Figure 12:
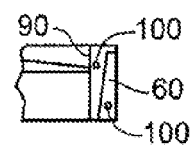
FIG. 12 is a inside surface view of a side rail member, showing a raised lip and protrusion.
Figure 12A:
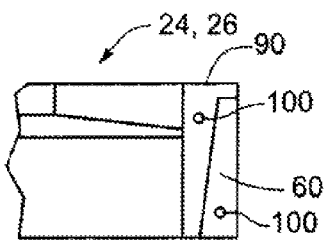
FIG. 12A is an expanded view of an inside surface view of a side rail member, showing a raised lip and protrusion.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives.

DETAILED DESCRIPTION OF THE INVENTION

FIG. 1A illustrates a sofa 5 with a showood base 10 exteriorly exposed at a lower perimeter 15 of the sofa. FIG. 1C illustrates an exploded view of the sofa with the base 10. The base 10 is attached to a sofa frame 11 conventionally formed of plywood, and upholstery 13 is attached thereto. FIG. 1B illustrates the partially assembled showood base 10 configured as an integrated base assembly 10, for a sofa. Other furniture products can suitably use the invention described herein, for example, an upholstered chair. The integrated base assembly 10 comprises four rail members 20, 22, 24, 26, configured as short rails 24, 26 and long rails 20, 22, as well as four corner block portions 30 and four leg members 40. In one embodiment, the construction of the integrated base assembly 10 is such that two of the four rail members 20, 22 include the corner block portions 30 as an integral unitary piece of the rail member 20, 22, that is the portions were joined when originally formed such as by injection molding. Hence, the integrated rail member 20, 22 includes a horizontal rail segment, as well as a corner block portion 30 integrally formed at each free end of the horizontal rail member. The integrated base assembly 10 comprises two integrated rail members 20, 22, which include corner block portions 30, and two connecting rail members 24, 26. The connecting rail members 24, 26 are positioned opposite one another and the integrated rail members 20, 22 are positioned opposite one another. In the present embodiment, each free end of one the connecting rail members 24, 26 is affixed to a corner block portion 30 of an integrated rail member 20, 22 forming the connections each with an exposed joint. The integrated rail members 20, 22, form the front rail member and the rear rail member of the integrated base assembly 10.

The configuration of the joints of the integrated base assembly 10 greatly reduces the opportunity for gaps to form between the rail members 20, 22, 24, 26 and the corner block portions 30 of the integrated rail members 20, 22 at the joints. Further, the positioning of an integrated rail member 20 in the front aspect of the integrated base assembly 10 under the leg support area of, for example, a sofa or chair, provides for an attractive, joint-free front rail member. This lack of a joint assembly in a front aspect of an integrated base assembly 10 provides for a smooth, aesthetically pleasing front rail member of the furniture product. The joint assembly of the integrated base assembly 10 at the side aspect of the integrated base assembly 10 minimizes the impact of any potentially aesthetically undesirable joint by minimizing gap formation at the joint and positioning the joint at a side aspect. Further, as described below, the joint construction between an integrated rail member 20, 22 and a side rail member 24, 26 reduces not only the typical number of components and assembly time, but further reduces the potential for an aesthetically undesirable appearing joint. Generally, the front rail member is exposed to view when the furniture product is positioned in a room or on display.

The integrated rail members 20, 22 and the side rail members 24, 26 can be constructed of various materials, including plastic, wood, resin, or other synthetic material. The integrated rail members 20, 22 can be injection molded as a one-piece construction from a plastic resin or, alternatively, can be integrally formed from wood. Various moldable materials for the integrated base assembly 10, providing the needed strength of support, are contemplated, such as polyethylene and polyurethane.

Referring to FIGS. 2, 3, 4 and 5, a more detailed depiction of an integrated rail member 20, 22, including the corner block portion 30 is shown. An integrated rail member 20, 22, comprises a horizontal rail member and a corner block portion 30, wherein the corner block portion 30 and horizontal rail member are integrally formed. The integrated rail member 20, 22 so formed, dispenses with the need to connect the horizontal rail member with the corner block portion 30. Further, each rail member 20, 22, 24, 26, comprises an upper surface 21, a lower surface 23, an outer-rail surface 25, and an inner-rail surface 27. The rail member 20, 22, 24, 26 also has a rail thickness W. Ledges 37, 38 extend inwardly from either or both of the short rails and long rails and provide a flange or expanded engagement surface for supporting and securing the sofa frame. Screws may be inserted through the ledge into the frame.

In one embodiment, an integrated rail member 20, 22, comprises a corner block portion 30 at each end of the integrated rail member. The free end of the integrated corner block portion 30 comprises a rabbet 50; an L-shaped groove cut across the end of the corner block portion 30 of the integrated rail member 20, 22. The rabbet 50 further comprises a stopped groove 52 cut into the horizontal surface of the rabbet 50, distal the free edge of the corner block portion 30 of the integrated rail member 20, 22. The stopped groove 52 defines a raised lip 51 in the horizontal surface of the rabbet 50, proximate the free edge of the corner block portion 30 of the integrated rail member 20, 22. In another embodiment, the stopped groove 52 can be cut into the horizontal surface of the rabbet 50, proximate the free edge of the corner block portion 30 of the integrated rail member 20, 22, thereby positioning the raised lip 51 distal the free edge of the corner block portion 30 of the integrated rail member 20, 22. Further, in the embodiment described herein, the stopped groove 52 is wedge-shaped, however, other shapes for the stopped groove are contemplated. The wedge-shaped stopped groove 52 has a depth that extends a pre-determined distance below the horizontal rabbet 50 surface. The stopped groove 52 configuration provides for a more controlled mating of a mirror-shaped protrusion; in this embodiment, a wedge-shaped protrusion, as the protrusion is receivable in the stopped groove 52 and requires no equipment to align the protrusion and the stopped groove 52. A groove that was cut through, from the upper surface 31 to the lower surface 33 of a corner block portion 30, would likely require additional time to properly position the mating protrusion and can potentially require use of a jig or fixture.

As illustrated in FIGS. 6, 7, 8, and 9, a side rail member 24, 26 comprises a raised lip 90, with a greater dimension in the vertical direction, on the inner surface 27 of the side rail member 24, 26, at each free end of the side rail member 24, 26. The raised lip 90 further comprises a protrusion 60, also with a greater dimension in the vertical, and, in this described embodiment, a tongue or wedge-shaped protrusion 60. However, it is noted, as other shapes for the stopped groove 52 are contemplated, so are matching shapes for a protrusion 60 contemplated. The protrusion 60 is slidably receivable in the stopped groove 52 of the integrated rail member 20, 22 accomplishing a tongue-in-groove connection and providing an interlacing as best shown in FIG. 21. Further, side rail members 24, 26, may comprise a plurality of apertures capable of receiving a fastener, such as a screw, nail, bolt and the like.

The joint assembly of the integrated base assembly 10 can be assembled by slidingly connecting the protrusion 60 of a side rail member 24, 26, with the stopped groove 52 of a rabbet 50 in a corner block portion 30 of the integrated rail member 20, 22. Once the side rail member 24, 26 and the integrated rail member 20, 22 are slidably connected, fasteners 102 can be positioned through apertures 100 in the inner surface 27 of the integrated rail member 20, 22 such that the fasteners connect the integrated rail member 20, 22 to the side rail member 24, 26.

As shown in FIG. 4, fasteners can be positioned in the apertures 100 defined by the stopped groove 52 and the raised lip 51, proximate an upper surface 31 of an integrated rail member 20, 22 and proximate a lower surface 33 of an integrated rail member 20, 22.

The slidable interconnection of the side rail member 24, 26, end and the integrated rail member 20, 22, with securement provided by fasteners, for example, screws, nails, bolts, or the like, provides for a secure joint with minimal to no gap formed between the integrated rail member 20, 22 and the side rail member 24, 26. There is no gap formation in the front aspect of the integrated base assembly 10 because the corner block portion 30 is integral with the front rail member, forming the integrated rail member 20. The joining seam of the integrated rail member 20, 22 and the side rail member 24, 26 is located in a side aspect of the integrated base assembly 10. As noted in FIG. 1, both free ends of the side rail member 24, 26 contain a protrusion 60 such that both ends of the side rail 24, 26 are affixed to an integrated rail member 20, 22 in the same manner as just described. Once the side rail member 24, 26 is slidably interconnected with the integrated rail members 20, 22, fasteners are provided, thus securing each end of the side rail member 24, 26 to the respective integrated rail member 20, 22. This method of assembly does not require the use of jigs or fixtures to hold the components in place, due to the ease of assembly. Integration of the corner block portion 30 with the front and rear rail members 20, 22, eliminates any gaps in the front and rear aspects of the integrated base assembly 10 and increases the strength of the joint.

In an alternate embodiment, the rail members 20, 22, 24, and 26 each comprise a raised lip 90 on the inner surface 27 of the rail member 20, 22, 24, 26, at a free end of the rail member 20, 22, 24, 26. The raised lip 90 further comprises a protrusion 60 and, in this embodiment, a wedge-shaped protrusion 60. However, it is noted, that other shapes for the protrusion 60 are contemplated. The remaining free end of the rail member 20, 22, 24, 26 comprises a rabbet 50; an L-shaped groove cut across the end of the rail member 20, 22, 24, 26. The rabbet 50 further comprises a stopped groove 52 cut into the horizontal surface of the rabbet 50, distal the free edge of the rail member 20, 22, 24, 26. In another embodiment, the stopped groove 52 can be cut into the horizontal surface of the rabbet 50, proximate the free edge of the rail member 20, 22, 24, 26. The placement of the protrusion 60 as defined by the end of a rail member 20, 22, 24, 26 is further defined by the matching placement of a stopped groove 52. Further, in the embodiment described herein, the stopped groove 52 is wedge-shaped, however, other shapes for the stopped groove 52 are contemplated. The wedge-shaped stopped groove 52 has a depth D that extends a pre-determined distance below the horizontal rabbet 50 surface. As other shapes for the stopped groove 52 are contemplated, so are matching shapes for a protrusion 60 contemplated. The protrusion 60 is slidably receivable in the stopped groove 52 of the rail member 20, 22, 24, 26. Hence, for example, the protrusion 60 of rail member 20 is receivable in the stopped groove 52 of rail member 24, whose protrusion 60 is receivable in the stopped groove 52 of rail member 22, whose protrusion 60, in turn, is receivable in the stopped groove 52 of rail member 26, and the protrusion 60 of rail member 26 is receivable in the stopped groove 52 of rail member 20.

Figure 13:
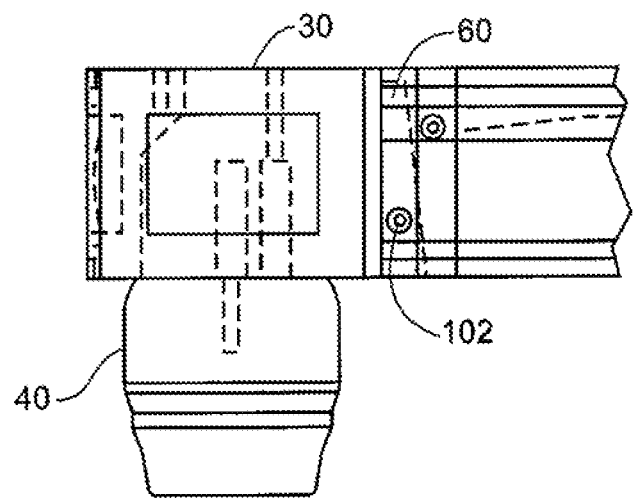
FIG. 13 is a side view of an integrated base assembly showing the integrated rail member and side rail member joint, as well as a leg attached to the integrated rail member.
Figure 14:
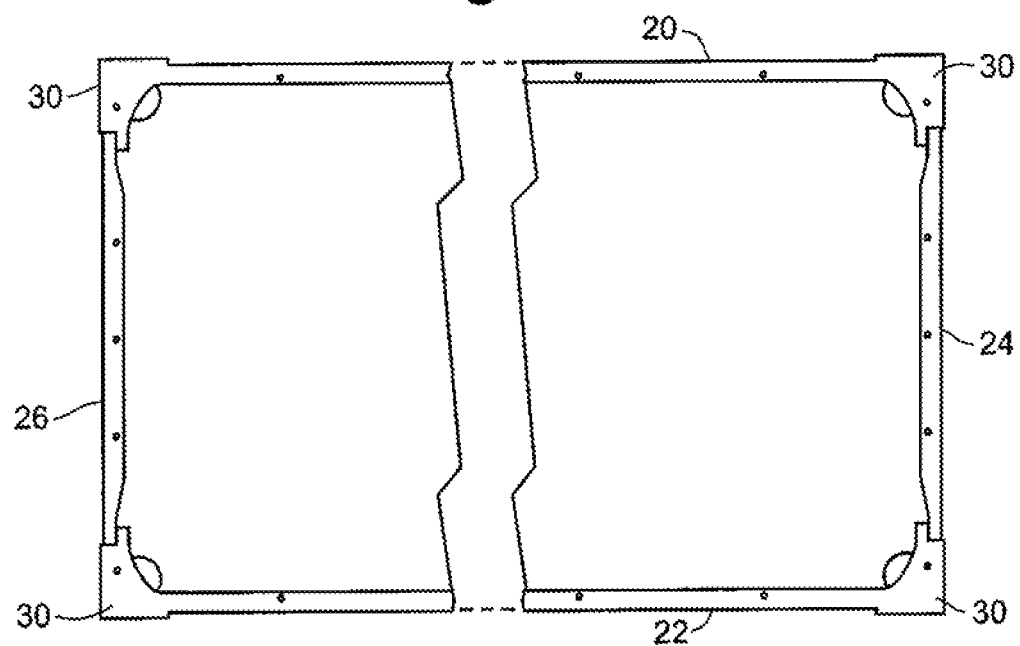
FIG. 14 is a top planar view of an assembled integrated base assembly.
Figure 16:
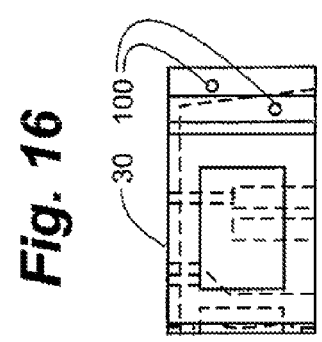
FIG. 16 is an inside surface view of the joint area of an integrated rail member.
Figure 15:
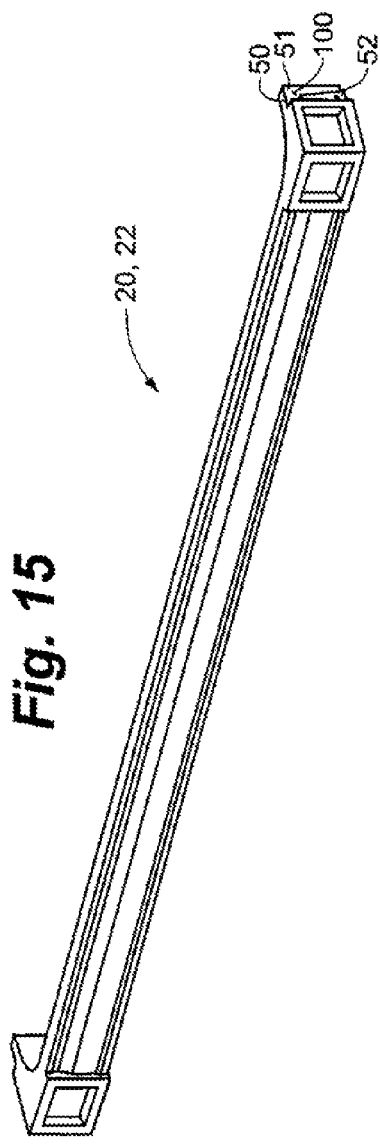
FIG. 15 is a perspective view of an integrated rail member.
Figure 17:
FIG. 17 is a bottom planar view of an integrated rail member.
Figure 18:
FIG. 18 is a side view of an integrated rail member.

As shown in FIG. 13, the leg member 40 is affixed to the integrated rail member 20, 22 via use of fasteners. The leg member defines at least one aperture, and preferably a plurality of apertures, which are aligned with apertures defined by the integrated rail member 20, 22. Fasteners, for example, screws, nails, bolts, and the like, fasten the leg member 40 to the integrated rail member 20, 22. In a particular embodiment, the leg member 40 is fastened to the integrated rail member 20, 22 through the corner block portion 30.

Figure 19:
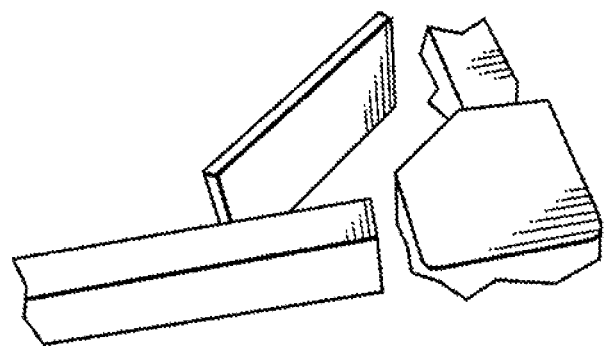
FIG. 19 is a perspective view of a known base assembly showing component pieces.
Figure 20:
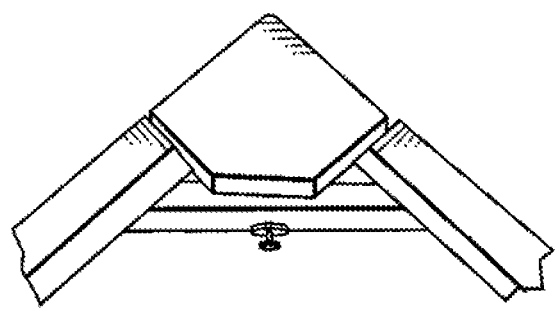
FIG. 20 is a perspective view of a known base assembly.

It is known in the furniture industry that various assemblies composing the furniture product may contain stains or other coatings to provide a finished wood grain or other appearance. It is desirable that the color and finish of the furniture components match to provide an aesthetically pleasing coordinated furniture product. However, on occasion, colorant lots, stain lots, and wood grain may vary such that some variation in color may be present. The integrated base assembly 10 of the present disclosure, due in part to the integration of the corner block portion 30 with the integrated rail member 20, 22, and the reduced number of components, increases the probability that the color of components will match without undue creation of scrap material, for a more aesthetically pleasing product. For instance, corner blocks are often separate components, as shown in FIGS. 19 and 20, which are affixed to the rails in the base assembly. The color lot associated with the corner block may vary as compared to the rail members, resulting in a less than desirable base assembly and finished furniture product. This color variation is especially noticeable when the furniture product is viewed from the front, as typically seen in a home or other environment, or on display. With the corner block portion 30 an integral segment of the integrated rail member 20, 22, the variation for color is greatly diminished, resulting in a more aesthetically desirable and pleasing base assembly and finished furniture product. This is particularly true when the rail systems are manufactured by injection molding.

The integrated base assembly 10 of the instant disclosure provides for a base system that can be efficiently and economically shipped in its unassembled form, and yet can be efficiently and economically assembled without the use of jigs or fixtures. The unassembled form of the integrated base assembly can be shipped from one geographic location of manufacture to another geographic location for assembly. The integrated base assembly 10 components can be injection molded or made from wood, for example; packed in unassembled form into shipping cartons/containers at a first geographic location; shipped; unpacked at a second geographic location, preferably at least 1,000 miles from the first geographic location; the components are assembled as described above, into a plurality of showood bases; and the assembled showood bases are attached to a plurality of furniture frames, for example, chair and sofa frames.

The integrated base assembly also provides a mechanism for eliminating gaps at the intersection of the rail members, thus providing a more pleasing base assembly and aesthetically pleasing furniture product. In addition, with the integrated corner block portion 30 and rail system, the variation of component color among the rail members and corner block portions 30 is greatly diminished, also leading to a more aesthetically pleasing furniture product.

The foregoing is considered as illustrative only of the principles of the disclosure. Further, since numerous changes and modifications will readily occur to those skilled in the art, it is not desired to limit the disclosure to the exact construction and operation shown and described, and accordingly, all such suitable changes or modifications in structure or operation which may be resorted to are intended to fall within the scope of the claimed disclosure.

While the description of the disclosure is amenable to various modifications and alternative forms, specifics thereof have been shown by way of example in the drawings and have been described in detail. It should be understood, however, that the description of the disclosure is not to limit the disclosure to the particular embodiments described. On the contrary, the intention is to cover all modifications, equivalents, and alternatives.

I claim:

1. A method of manufacturing furniture comprising:
   a) injection molding a plurality of front rails each with two integrally formed corner block portions, each of the front rails having a front side and a back side,
   b) injection molding a plurality of side rails, the side rails configured to be attachable to the front rails at the corner block portions at the back sides of the front rails,
   c) injection molding a plurality of back rails configured to be attachable to the side rails;
   b) packing the pluralities of front rails with attached corner block portions, side rails attachable to the front rails at the corner block portions, and back rails attachable to the side rails, unassembled into shipping cartons at a first geographic location;
   c) unpacking the pluralities of front rails with attached corner block portions, side rails attachable to the front rails at the corner block portions, and back rails attachable to the side rails, at a second geographic location at least 1,000 miles from the first geographic location;
   d) assembling the pluralities of front rails with attached corner block portions, side rails attachable to the front rails at the corner block portions, and back rails attachable to the side rails, into a plurality of showood bases; and
   e) attaching the plurality of showood bases to a plurality of seat frames.

2. The method of claim 1 wherein the plurality of back rails each further comprises two integrally formed corner block portions.

3. The method of claim 1 wherein at least one end of the side rail members comprises a lip wherein the lip further comprises a protrusion.

4. The method of claim 3 wherein the corner block portion comprises a rabbet wherein the rabbet further comprises a stopped groove with a predetermined depth adapted to receive the protrusion in the at least one end of the side rail member.

5. The method of claim 1 further comprising attaching upholstery to the plurality of seat frames wherein the seat frames are selected from the group consisting of sofa frames, chair frames, extended chair frames, and loveseat frames.

6. A method of manufacturing furniture comprising:
   a) receiving a packed plurality of injection molded front rails each with two unitary formed corner block portions, each of the front rails having a front side and a back side, a plurality of injection molded side rails, the side rails configured to be attachable to the front rails at the corner block portions at the back sides of the front rails and a plurality of injection molded back rails configured to be attachable to the side rails;
   b) unpacking the pluralities of front rails with attached corner block portions, side rails attachable to the front rails at the corner block portions, and back rails attachable to the side rails,
   c) assembling the pluralities of front rails with attached corner block portions, side rails attachable to the front rails at the corner block portions, and back rails attachable to the side rails, into a plurality of showood bases; and
   d) attaching the plurality of showood bases to a plurality of seat frames.

7. The method of claim 6 wherein the plurality of back rails each further comprises two integrally formed corner block portions.

8. The method of claim 6 wherein at least one end of the side rail members comprises a lip wherein the lip further comprises a protrusion.

9. The method of claim 8 wherein the corner block portion comprises a rabbet wherein the rabbet further comprises a stopped groove with a predetermined depth adapted to receive the protrusion in the at least one end of the side rail member.

10. The method of claim 6 further comprising attaching upholstery to the plurality of seat frames wherein the seat frames are selected from the group consisting of sofa frames, chair frames, extended chair frames, and loveseat frames.

11. The method of claim 6 further comprising:
    injection molding the plurality of front rails,
    injection molding the plurality of side rails,
    and injection molding the plurality of back rails at a location at least 1,000 miles from where step c is performed.

12. A method of manufacturing furniture, the method comprising:
    Injection molding two unitary sofa rail members wherein one unitary rail member is a front rail member and one unitary rail member is a rear rail member, and wherein each integrated rail member comprises an integrally formed corner block portion at each free end of the integrated rail member;
    providing two sofa side rail members wherein each side rail member comprises two free ends; and
    affixing one free end of each side rail member to a corner block portion of the front rail member and affixing one free end of each side rail member to a corner block portion of the rear rail member.

13. The method of claim 12 wherein the side rail member comprises a lip with its greatest dimension vertical and the lip further comprises a protrusion with its greatest dimension vertical; the integrally formed corner block portion comprises a rabbet wherein the rabbet further comprises a stopped groove with a predetermined depth, and the stopped groove is adapted to receive the protrusion in the side rail member; wherein the protrusion is slidingly connected with the stopped groove.

14. The method of claim 13 wherein the lip comprises at least one aperture, the rabbet comprises at least one aperture, the apertures are aligned and at least one fastener is passed through the aligned apertures, securing the side rail member to the corner block portion of the integrated rail member.

15. The method of claim 12 wherein the fastener is selected from the group consisting of nails, screws, and bolts.

* * * * *